(12) United States Patent
Morin et al.

(10) Patent No.: US 10,147,033 B2
(45) Date of Patent: Dec. 4, 2018

(54) ELECTRONIC COMPONENT SUITABLE FOR DETECTING ATTACKS BY DELIVERING ENERGY

(75) Inventors: Nicolas Morin, Talence (FR); Hugues Thiebeauld De La Crouee, Pessac (FR)

(73) Assignee: OBERTHUR TECHNOLOGIES, Levallois Perret (FR)

( * ) Notice: Subject to any disclaimer, the term of this patent is extended or adjusted under 35 U.S.C. 154(b) by 760 days.

(21) Appl. No.: 12/967,879

(22) Filed: Dec. 14, 2010

(65) Prior Publication Data

US 2011/0139879 A1   Jun. 16, 2011

(30) Foreign Application Priority Data

Dec. 14, 2009   (FR) ...................................... 09 58940

(51) Int. Cl.
*G06K 19/073*   (2006.01)
(52) U.S. Cl.
CPC ................................. *G06K 19/073* (2013.01)
(58) Field of Classification Search
CPC ...... G06K 7/084; G06K 19/00; G06K 19/073; H02H 7/00; G01R 31/08
USPC ........................................... 235/492; 702/64
See application file for complete search history.

(56) References Cited

U.S. PATENT DOCUMENTS

| 7,808,842 | B1* | 10/2010 | Raghavan et al. ........ 365/189.07 |
| 8,210,440 | B1* | 7/2012 | Pinai .............................. 235/494 |
| 2005/0045731 | A1 | 3/2005 | Kojima et al. |
| 2006/0041402 | A1* | 2/2006 | Baker ........................... 702/189 |
| 2006/0114624 | A1* | 6/2006 | Sharma .......................... 361/18 |
| 2007/0076890 | A1 | 4/2007 | Muresan et al. |
| 2007/0139988 | A1* | 6/2007 | Malherbe ............. G06K 19/073 365/43 |
| 2007/0182421 | A1* | 8/2007 | Janke et al. .................. 324/522 |
| 2010/0013631 | A1* | 1/2010 | Laackmann ....... G06K 19/0716 340/540 |
| 2010/0299756 | A1 | 11/2010 | Ostertun et al. |

FOREIGN PATENT DOCUMENTS

| CN | 101427192 | 5/2009 |
| CN | 101438303 | 5/2009 |
| EP | 1 804 199 | 7/2007 |
| TW | 200919167 | 5/2009 |
| WO | WO 2007/122551 | 11/2007 |

* cited by examiner

*Primary Examiner* — Sonji N Johnson
(74) *Attorney, Agent, or Firm* — Cozen O'Connor

(57) ABSTRACT

The electronic component comprises: reference-obtaining means for obtaining a physical magnitude referred to as a reference magnitude, which magnitude is dynamically adjustable and representative of the expected activity of said component; comparator means suitable for comparing said reference magnitude with a magnitude of the same type representative of the real activity of said component; and detector means suitable for detecting an attack as a function of the result of said comparison.

15 Claims, 4 Drawing Sheets

ELECTRONIC COMPONENT SUITABLE FOR DETECTING ATTACKS BY DELIVERING ENERGY

RELATED APPLICATIONS

This application claims the priority of French patent application Ser. No. 09/58940 filed Dec. 14, 2009, the entire content of which is hereby incorporated by reference.

BACKGROUND OF THE INVENTION

The present invention lies in the field of protecting electronic components.

More particularly, it relates to an electronic component suitable for detecting an active attack.

It is common practice to distinguish active attacks from passive attacks.

A passive attack is an attack in which the attacker is content merely to observe the activity of the component.

In contrast, an active attack is an attack by injecting a fault whereby the attacker physically disturbs the component while it is executing sensitive algorithms or commands.

Such disturbances are manifested at the component by a delivery of energy (e.g. light or electromagnetic energy). This delivery of energy gives rise to an increase in current that serves to place the component in an unexpected and fragile state.

It is known to evaluate the security of smart cards by analyzing their behavior in response to injecting a fault by means of light energy from a laser.

Figure 1:
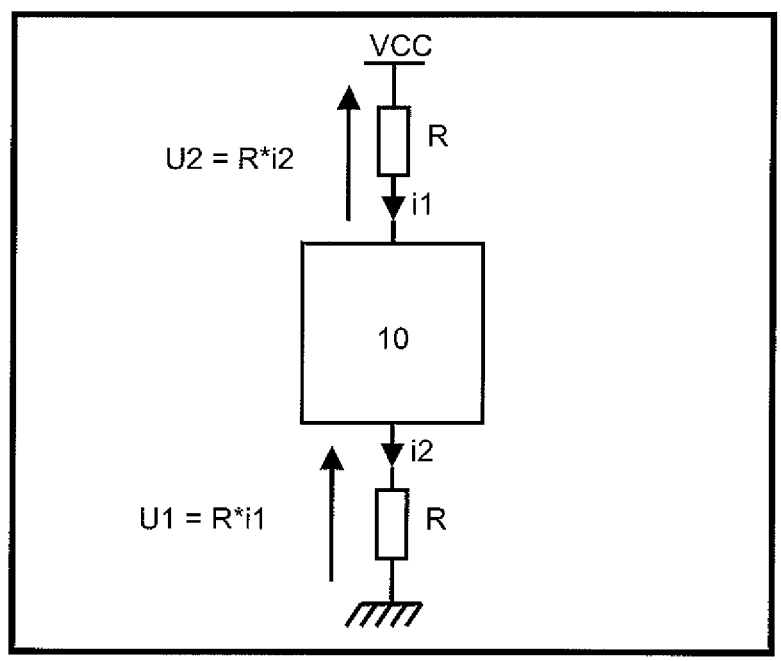

FIG. 1 shows the principle of such an evaluation.

With reference to FIG. 1, a component 10 is connected in series between two resistors having resistances R, one connected to ground and the other to a positive voltage Vcc, and then the component is illuminated with a laser pulse.

This delivery of energy gives rise to surplus current both upstream (Vcc) and downstream (Gnd) of the component at the moment of the light disturbance and throughout the duration thereof. This surplus current may be caused by two reasons:

it may be induced by the light pulse, with the light creating as many holes as electrons; the holes flow towards the positive voltage Vcc and the electrons to ground, thereby impacting the currents i1 and i2;
 it may also be caused by short-circuit currents in the component that are themselves caused by the light pulse.

At present, no method is known for detecting such attacks.

Document EP 1 804 199 describes a method of detecting an attack that consists in varying the positive voltage Vcc. Unfortunately, that method does not serve to detect an attack by delivering energy, of the same type as the above-described laser attack, which attack has no effect on the voltage Vcc.

OBJECT AND SUMMARY OF THE INVENTION

One object of the invention is to provide a component suitable for detecting an attack by delivering energy.

One aspect of the invention is directed to an electronic component comprising:

reference-obtaining means for obtaining a physical magnitude referred to as a reference magnitude, which magnitude is dynamically adjustable and representative of the expected activity of said component;
 comparator means suitable for comparing said reference magnitude with a magnitude of the same type representative of the real activity of said component; and
 detector means suitable for detecting an attack as a function of the result of said comparison.

Correspondingly, the invention provides a protection method for protecting an electronic component and comprising:

a reference-obtaining step of obtaining a "reference" physical magnitude that is dynamically adjustable as representative of the expected activity of said component;
 a comparison step of comparing said reference magnitude with a magnitude of the same type representative of the actual activity of said component; and
 a detection step of detecting an attack as a function of the result of said comparison step.

In general, the invention seeks to detect any abnormal increase in current through the component.

By way of example, the invention may be implemented by comparing a current that is representative of the current actually consumed by the component with a variable reference current that is dynamically adjustable and representative of the activity that is expected of the component.

In a particular embodiment, the electronic component of the invention includes a logic unit suitable for generating an electric current of magnitude that is equal to the above-mentioned variable reference current.

More precisely, given that during normal use the consumption of the component depends to a great extent on its activity while executing a command, the invention proposes performing dynamic monitoring by adjusting the reference magnitude as a function of the activity expected of the component at a given instant.

Thus, at each instant, the component of the invention monitors whether its level of current consumption does or does not exceed a threshold, with the threshold varying dynamically as a function of the activity of the chip. If at a given instant the threshold is exceeded, that means that the component is being subjected to an attack by delivering energy, and an alarm may be triggered in order to respond thereto.

In a particular embodiment, the electronic component includes at least one module, and the reference current is representative, at a given instant, of the maximum expected consumption of the modules active at that instant.

In a particular embodiment, the logic unit has as many resistors in parallel as the component has said modules, each resistor being connected to one of said modules via a switch and being dimensioned so that the current that flows through said resistor, when said module is active, represents the expected maximum consumption of said module at that instant.

In a particular embodiment, the electronic component includes a processor suitable for setting the switch associated with a resistor of the logic unit as a function of the active or inactive character of the module associated with the resistor.

In a variant, the switch may be set by hardware means.

In a particular embodiment, the comparator means are constituted by a register presenting an input capacitor suitable for being charged or for discharging depending on whether the current representative of the current actually consumed exceeds or does not exceed the reference current.

In a particular embodiment of the invention, the current representative of the current actually consumed is obtained by a current mirror from the current that is actually consumed.

In a particular embodiment of the invention, the current through the current mirror used for detection purposes is equal to the current actually consumed by the component.

In a variant, the current through the current mirror is less than and proportional to the current actually consumed by the component, thus making it possible to use a current level that is much smaller for detecting the fault, so as to limit the amount of current consumed by the current mirror.

In another embodiment of the invention, the physical magnitude taken into account for determining the nature of the expected and actual activity of the component is a voltage.

Thus, in a particular embodiment, the electronic component of the invention includes means for obtaining a "reference" voltage that is dynamically adjustable and representative of the expected activity of the component, and comparator means suitable for comparing said reference voltage with a voltage that is representative of the real consumption of the component.

Another aspect of the invention is directed to a smart card (or microcircuit card) complying with the ISO 7816 standard and including a microcontroller constituted by an electronic component as specified above.

In a particular embodiment, the various steps of the above-mentioned protection method are determined by computer program instructions.

Another aspect of the invention is directed to a computer program on a data medium, the program being suitable for being implemented in a microcircuit card, the program including instructions adapted to implementing the steps of the first protection method as mentioned above.

The program may use any programming language, and be in the form of source code, object code, or code intermediate between source code and object code, such as in a partially compiled form, or in any other desirable form.

Another aspect of the invention is directed to a data medium readable by a computer, and including computer program instructions as mentioned above.

The data medium may be any entity or device capable of storing the program. For example, the medium may comprise storage means, such as a read-only memory (ROM), a compact disk ROM (CD ROM), or a microelectronic circuit ROM, or indeed magnetic recording means, e.g. a floppy disk or a hard disk.

Furthermore, the data medium may be a transmissible medium such as an electrical or optical signal, suitable for being conveyed via an electrical or optical cable, by radio, or by other means. The program of the invention may in particular be downloaded from a network of the Internet type.

Alternatively, the data medium may be an integrated circuit in which the program is incorporated, the circuit being adapted to execute or to be used in the execution of the method in question.

DETAILED DESCRIPTION OF THE DRAWINGS

Figure 2:
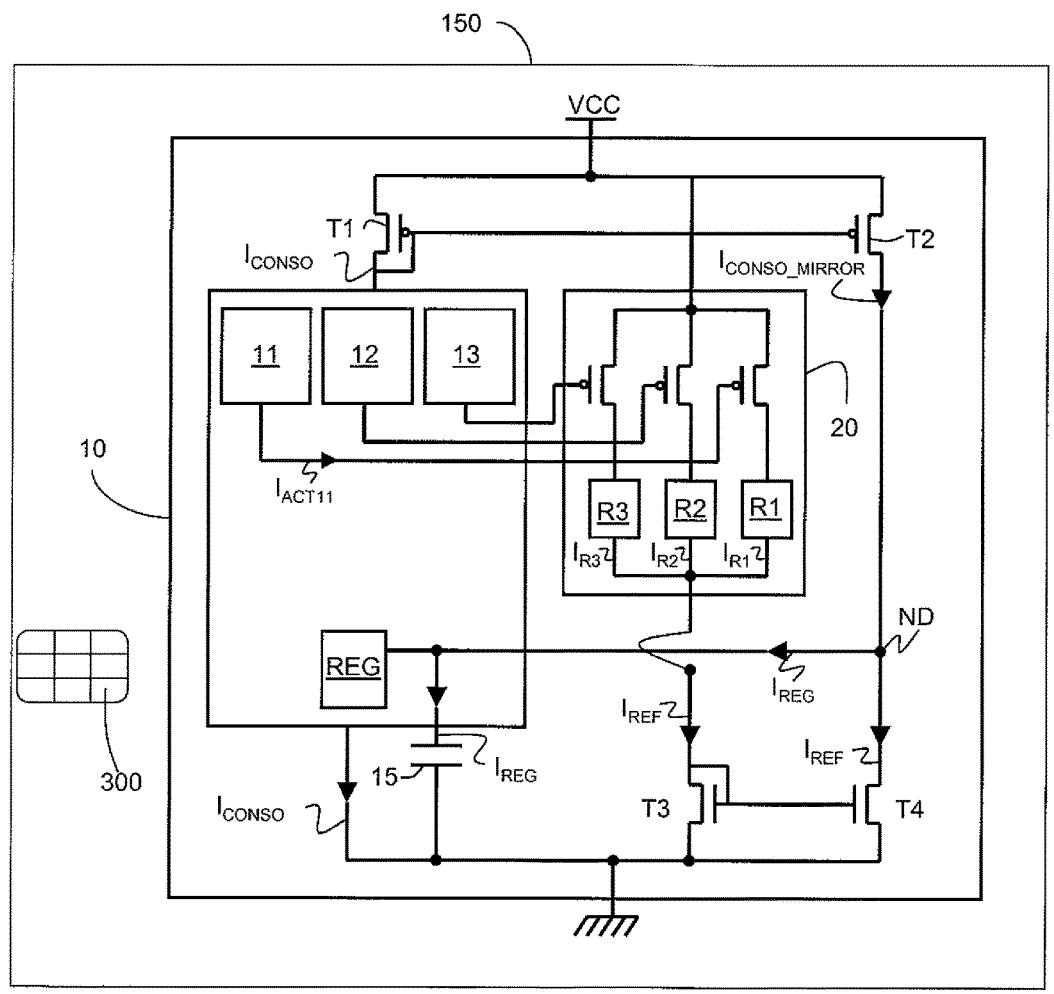
Figure 3:
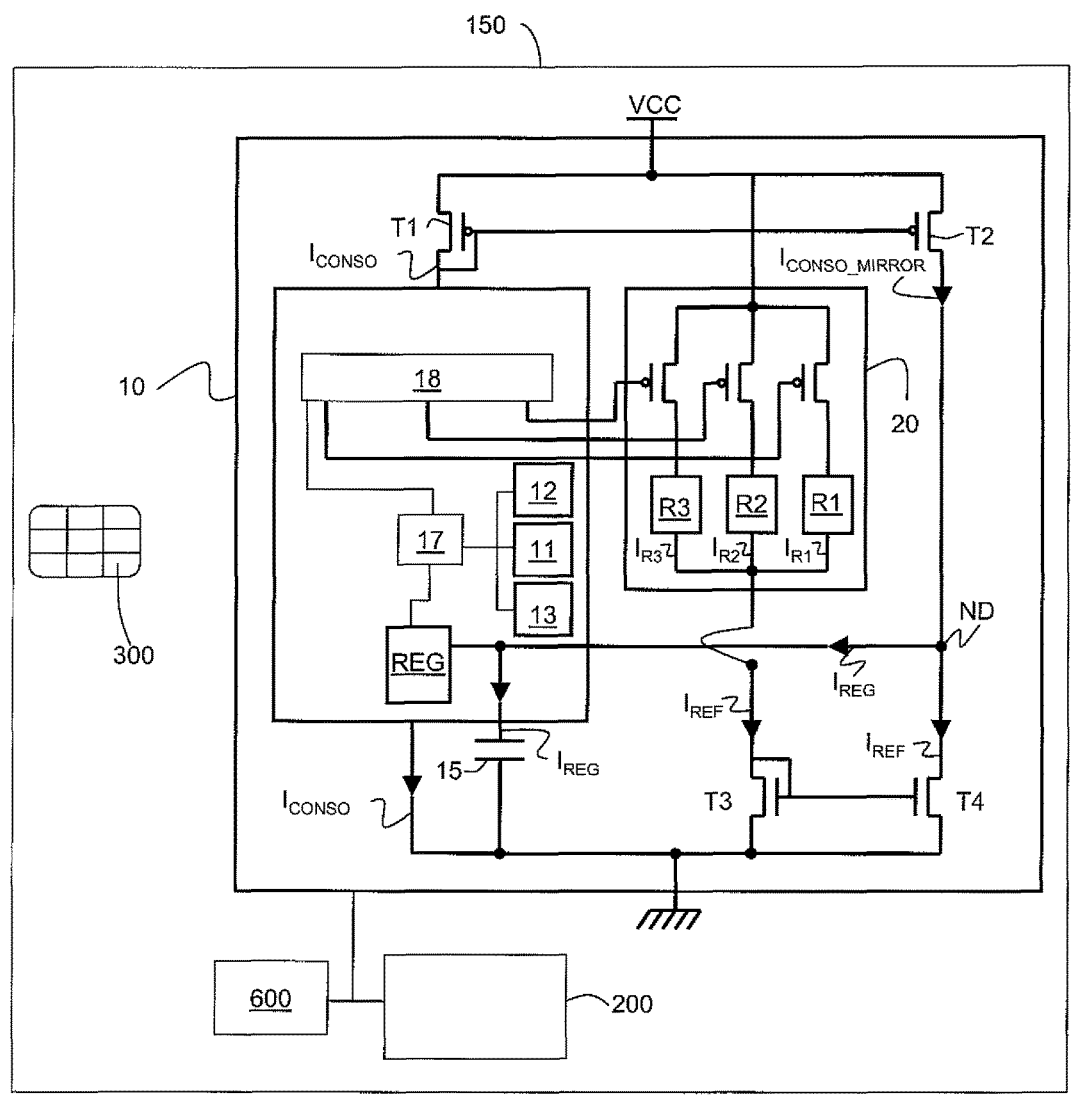
Figure 4:
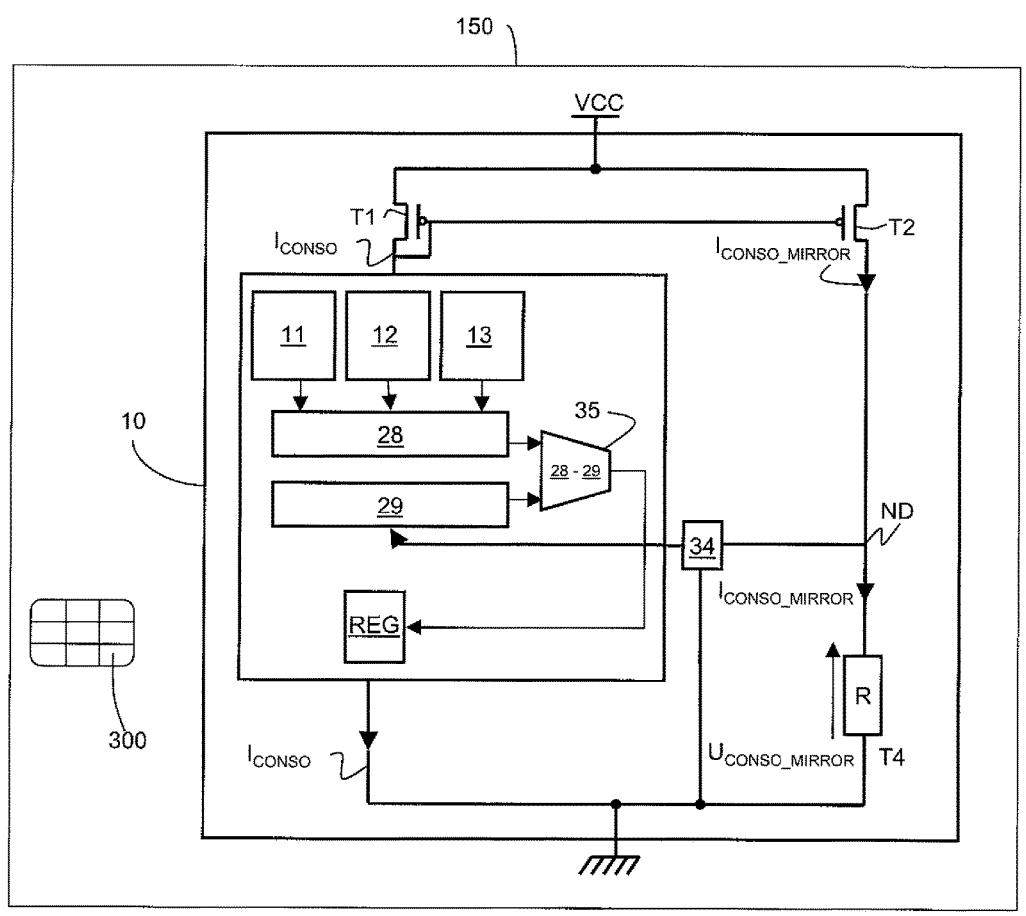

Other characteristics and advantages of the present invention appear from the following description given with reference to the accompanying drawings that show an embodiment having no limiting character. In the figures:

FIG. 1, described above, shows an active attack that can be detected by the invention; and FIGS. 2 to 4 show three electronic components in accordance with particular embodiments of the invention.

DETAILED DESCRIPTION THE DRAWINGS

FIG. 2 shows a smart card 150 in accordance with the invention.

The smart card 150 complies with the ISO 7816 standard. It has an electronic component 10 in accordance with a first embodiment of the invention.

The microcircuit card 150, or more precisely the electronic component 10 incorporated therein, is suitable for exchanging data with an entity outside the card via a communications interface 300 implemented in the form of contacts. In this embodiment, the invention is implemented by hardware means.

In this example, the electronic component 10 has three modules 11, 12, and 13.

In accordance with the invention, the electronic component 10 has a logic unit 20 suitable for generating an electric current of variable magnitude referred to as a "reference" current, $I_{REF}$.

In this embodiment, the logic unit 20 comprises three resistors R1, R2, and R3 in parallel. Each of these resistors has one terminal connected to a positive power supply Vcc via a PMOS switch and one terminal connected to ground.

In this embodiment, each of the resistors R1 to R3 may be connected or not connected to one of said modules 11 to 13 via a switch, e.g. of the PMOS type, the switch being closed when the module in question is active and open otherwise.

More precisely, when, by way of example, the module 11 becomes active, it generates an activity signal $I_{ACT11}$ that causes the PMOS switch connected to the module 11 to close and an electric current flows through the resistor R1 of magnitude $I_{R1}$ given by (Vcc−0)/R1.

In this embodiment of the invention, the resistor R1 is dimensioned such that the current $I_{R1}$ corresponds to the maximum consumption of the module 11. Similarly, the resistors R2 and R3 are dimensioned so that the currents $I_{R2}$ and $I_{R3}$ flowing therethrough, in the event of the modules 12 and 13 being active, correspond to the maximum consumption for each of these modules.

The reference variable current $I_{REF}$ thus corresponds at any given instant to the maximum consumption of the active modules 11 to 13.

The current actually consumed by the electronic component 10 is written $I_{CONSO}$.

In the example described here, the electronic component 10 comprises:

a first current mirror made up of two PMOS transistors T1, T2 suitable for copying the current $I_{CONSO}$ flowing through the branch of the transistor T1 and actually consumed by the electronic component 10 in the branch of the transistor T2;

a second current mirror made up of two NMOS transistors T3, T4 suitable for copying the reference current $I_{REF}$ flowing through the logic unit 20 in the branch of the transistor T4. In this example, the NMOS transistors T3 and T4 are of the same size.

In the embodiment described here, the electronic component 10 has a node ND having:

an input branch including the transistor T2 and conveying a current of magnitude $I_{CONSO\_MIRROR}$;

a first output branch including the transistor T4 and conveying a current of magnitude $I_{REF}$; and a second output branch connected to the electrode of the input capacitor 15 of the register REG and conveying a current of magnitude $I_{REG}$.

By applying Kirkhoff's laws to the node ND:

$$I_{REG} = I_{CONSO\_MIRROR} - I_{REF}$$

Naturally, when the transistors T1 and T2 are identical, the following applies:

$$I_{REG} = I_{CONSO} - I_{REF}$$

However the transistors T1 and T2 may be selected to be different. For example, in order to avoid excessively increasing consumption, it is possible for T2 to be one-tenth of T1. Under such circumstances, the resistors are given resistances that are ten times greater so that the currents $I_{REF}$ and $I_{CONSO\_MIRROR}$ are comparable.

In the embodiment described here, the component 10 has a register REG suitable for storing a binary value, this value depending on the charged/discharged character of the capacitor 15.

Under normal circumstances, the current $I_{REG}$ is negative, since the reference variable current $I_{REF}$ is selected to correspond to the maximum consumption of the active modules 11 to 13; the capacitor 15 discharges and the register REG is at a low level.

In contrast, when the electronic component 10 is subjected to an active attack causing surplus current to be delivered to the component, then the real consumption of this component exceeds the reference current and $I_{REG}$ is positive; the capacitor 15 charges and the register REG is at a high level.

Consequently, reading the level of the register REG serves to compare the reference current $I_{REF}$ with the current $I_{CONSO}$ actually consumed by the component 10.

In the embodiment described here, the output value from the register REG may generate an alarm signal for processing the attack as detected in this way.

FIG. 3 shows a smart card 150 in accordance with a second embodiment of the invention.

In this embodiment, the invention is implemented in part by software means. The electronic component 10 includes a processor 17 suitable for activating/deactivating each of the modules 11 to 13.

In this embodiment, the electronic component 10 is associated firstly with a random access memory (RAM) 600, and secondly with a non-volatile memory 200 (e.g. of the electrically erasable programmable read only memory (EE-PROM) type) by buses. The non-volatile memory 200 of the smart card 150 constitutes a data medium in accordance with the invention. It contains a computer program PG40 in accordance with the invention, this program having instructions suitable for implementing a protection method in accordance with the invention.

In this embodiment, the electronic component 10 has a configuration module 18 having a configuration bit associated with each of the modules 11 to 13.

The value of the bit associated with a module is set by the processor 17 as a function of the active/non-active character of the module.

In this embodiment, the PMOS switch associated with each of the resistors R1 to R3 is opened or closed as a function of the value of the bit associated with the module corresponding to the resistor.

In this embodiment, the processor 17 monitors the state of the register REG and triggers a signal when the state exceeds the second level.

FIG. 4 shows a smart card 150 in accordance with a third embodiment of the invention.

In this embodiment, the electronic component 10 has a node ND with:
an inlet branch including the transistor T2, and conveying a current of magnitude $I_{CONSO\_MIRROR}$
a first output branch having a resistor R and conveying a current of magnitude $I_{CONSO\_MIRROR}$ and
a second output branch connected to the input of an analog-to-digital converter 34 conveying a current of zero magnitude.

The voltage across the terminals of the resistor R is obtained by Ohm's law:

$$U_{CONSO\_MIRROR} = R * I_{CONSO\_MIRROR}$$

In the embodiment described here, the electronic component 10 includes a register 29 containing a digital value of the voltage $U_{CONSO\_MIRROR}$ that is representative of the real consumption of the electronic component 10.

In this embodiment, the electronic component 10 has a register 28 including a value representative of the voltage expected across the terminals of the electronic component 10 as a function of the activity of each of the modules 11 to 13. By way of example, the register may be configured directly by the modules.

In the embodiment described here, the electronic component 10 includes a subtracter 35 suitable for taking the difference between the contents of the registers 28 and 29, the carry signal being connected to the register REG.

At a given instant, the value of the register REG is consequently equal to 1 if the real consumption of the component 10 exceeds the consumption expected at said instant; the alarm signal then switches to the second level.

In each of the three embodiments described above, various actions may be undertaken in the event of the alarm signal switching to the second level, the level representative of an active attack. By way of example, the following are possible:
erasing the cryptographic keys stored in a non-volatile memory of the smart card 150;
erasing all or part of the non-volatile memory of the smart card 150; and/or
setting a software flag to 1, which flag is read each time the smart card 150 is powered up, with the detection of the value 1 inhibiting any use of the smart card.

What is claimed is:

1. An electronic component comprising:
a reference-obtaining device configured to obtain a physical magnitude, referred to as a reference magnitude, which is dynamically adjustable and representative of an expected activity of said component;
a tracking circuit configured to output a value representative of real activity of said component;
a first comparator configured to compare said dynamically adjustable reference magnitude with a magnitude of the value of a same type representative of real activity of said component; and
a detector configured to detect an attack as a function of a result of said comparison,
wherein the component comprises a plurality of modules, the dynamically adjustable reference magnitude being a function of the active or non-active character of each module of the plurality of modules and is representative of an expected activity of the component.

2. The electronic component according to claim 1, including a second comparator configured to compare a current representative of the current actually consumed by said component with a variable reference current that is dynamically adjustable to represent the activity expected of said component.

3. The electronic component according to claim 2, including a logic unit configured to generate an electric current of magnitude that is equal to said variable reference current.

4. The electronic component according to claim 2, wherein said reference current being representative, at a given instant, of a maximum expected consumption of the at least one module active at that instant.

5. The electronic component according to claim 4, wherein said logic unit has as many resistors in parallel as the component has modules, each resistor being connected to one of said at least one module via a switch and being dimensioned so that the current that flows through said resistor, when said module is active, represents the expected maximum consumption of said at least one module at that instant.

6. The electronic component according to claim 5, including a processor configured to set said switch as a function of the active or inactive character of said at least one module.

7. The electronic component according to claim 2, wherein said first comparator is a register presenting an input capacitor configured to be charged or for discharging depending on whether said current representative of the current actually consumed exceeds or does not exceed said reference current.

8. The electronic component according to claim 2, wherein said current representative of the current actually consumed is obtained by a current mirror from said current that is actually consumed.

9. The electronic component according to claim 1, further comprising:
a device configured to obtain a "reference" voltage that is dynamically adjustable and that is representative of the expected activity of said component; and wherein
said comparator is configured to compare said reference voltage with a voltage representative of the actual consumption of said component.

10. The electronic component according to claim 9, including at least one module and a register containing a value representative of the voltage expected across the terminals of said component as a function of the activity of each of said modules.

11. The electronic component according to claim 9, including:
a resistor in parallel with said component conveying a current of magnitude that is representative of the current actually consumed by said component; and
a register containing a digital value of the voltage across the terminals of said resistor and representative of the actual consumption of said component.

12. A smart card in compliance with the ISO 7816 standard, the card including a microcontroller constituted by an electronic component according to claim 1.

13. A protection method for protecting an electronic component, the method comprising:
obtaining a "reference" physical magnitude that is dynamically adjustable as representative of an expected activity of said component;
obtaining a value representative of real activity of said component;
comparing said reference magnitude with a magnitude of the value of the same type representative of the actual activity of said component; and
detecting an attack as a function of a result of said comparison,
wherein the component comprises at least one module, the dynamically adjustable reference magnitude being a function of the active or non-active character of each module of the plurality of modules and is representative of an expected activity of the component.

14. A computer program stored on a non-transitory recording medium including instructions for executing the steps of the protection method according to claim 13 when said program is executed by a computer.

15. A non-transitory recording medium readable by a computer having recorded thereon a computer program including instructions for executing the steps of the protection method according to claim 13.

* * * * *